United States Patent [19]
Karol

[11] Patent Number: 5,008,881
[45] Date of Patent: Apr. 16, 1991

[54] CHORDAL RING NETWORK

[75] Inventor: Mark J. Karol, Fair Haven, N.J.

[73] Assignee: AT&T Bell Laboratories, Murry Hill, N.J.

[21] Appl. No.: 526,097

[22] Filed: May 18, 1990

[51] Int. Cl.$^5$ .................................................. H04R 3/00
[52] U.S. Cl. ............................ 370/85.150; 370/85.50; 370/16.00; 370/85.12; 340/825.05; 340/825.01
[58] Field of Search ................ 370/85.15, 85.5, 85.12, 370/94.1, 16; 340/825.05, 825.01, 827

[56] References Cited

U.S. PATENT DOCUMENTS

| | | | |
|---|---|---|---|
| 4,862,161 | 8/1989 | Schomers | 340/825.01 |
| 4,862,496 | 8/1989 | Kelly et al. | 340/827 |
| 4,875,207 | 10/1989 | Van Twist et al. | 370/85.12 |

OTHER PUBLICATIONS

B. W. Arden et al., "Analysis of Chordal Ring Network", *IEEE Trans. on Computers*, Vol. C-30, No. 4, Apr. 1981, pp. 20-29.

L. Jin et al., "Analysis of Double-Chordal Ring Interconnection Network", *First International Conf. on Computers & Applications*, Jan. 1983, pp. 248-255.

M. J. Karol "Optical Interconnection Using ShuffleNet Multihop Networks in Multi-Connected Ring Topologies", *SIGCOMM '88 Symposium*, Aug. 16-19, 1988, pp. 25-34.

*Primary Examiner*—Douglas W. Olms
*Assistant Examiner*—Dang Ton

[57] ABSTRACT

A plurality of NIUs are interconnected by a multiple channel communications medium, and each NIU includes a sequence of inputs and outputs. Each channel is connected to a separate input, and exits the NIU at a separate output. The output that each channel exits is connected to the next input in the sequence of inputs on the next connector in the chordal ring. Further, channels which enter at a predetermined input of the NIU are cut and connected to a user equipment before exiting the NIU. Thus, if a predetermined channel is cut and connected to a particular user equipment, it will not be cut again at the next NIU since it will enter the next NIU at a different input in the input sequence. Indeed, the channel will not be cut again until N NIU's are traversed, where N is the length of the sequence. Thus, by choosing N to be the chordal length, an NIU is constructed which may be connected in an identical fasion to each user equipment in order to automatically establish chords in the network.

9 Claims, 6 Drawing Sheets

CHORDAL RING NETWORK

TECHNICAL FIELD

This invention relates to communications systems, and more particularly, to chordal ring networks.

BACKGROUND OF THE INVENTION

A typical ring type network of the prior art is shown in FIG. 1. For purposes of simplicity, it is assumed that all data propagates clockwise through the network. The network of FIG. 1 comprises ten exemplary Network Interface Units (NIU) 101-110. Communications from a first NIU to a second NIU is accomplished by passing data packets around the network from one NIU to the next. Each NIU reads the address in an arriving data packet. If the address matches the NIU's address, the data packet is processed by that NIU, and forwarded to the associated user equipment. Otherwise, the data packet is simply passed to the next NIU in the ring. This process continues until the data packet reaches the NIU for which it is destined. For example, a data packet to be transmitted from NIU 101 to NIU 104 is passed from NIU 101-102, from NIU 102 to 103, and from NIU 103 to 104.

Each packet transmitted through the ring network of FIG. 1 must be processed by each of the NIUs disposed between the transmitting and receiving NIUs. Therefore, packets are delayed substantially.

Recently, chordal rings have been proposed in order to help eliminate some of the delay problems posed by the network of FIG. 1. See for example, the article "Analysis of Chordal Ring Network", by B. W. Arden et al. in *IEEE Transactions on Computers*, Vol. C-30, No. 4, Apr. 1981, pp. 291-295, which analyses the reduction in delay achieved by these chordal ring networks. FIG. 2 shows a typical chordal ring network. The connections among the NIUs of FIG. 2 include all those of FIG. 1. Additionally, in FIG. 2. each NIU is arranged to communicate to the NIU disposed two NIUs away on the network. For purposes of explanation herein, the chordal length of the network is defined as the number of NIUs between the beginning and end of the chord, with the beginning NIU not counted. For example, the chordal length in FIG. 2 would be two.

The chordal ring network of FIG. 2 has much better delay performance than the ring network of FIG. 1. For example, consider the transmission of a data packet in the network of FIG. 2 from NIU 201 to NIU 206. The data packet could be transmitted from NIU 201 to NIU 203, from NIU 203 to NIU 205, and from NIU 205 to NIU 206. Note that only two intermediate NIUs must process the data packet, rather than four, as would be the case for the ring network of FIG. 1.

FIG. 3 shows a slightly more complex chordal ring network. In the network of FIG. 3, 16 NIUs are disposed along a communications medium. Each NIU transmits to the NIU immediately subsequent to it on the network. Additionally, each NIU is arranged to transmit to the NIUs which are disposed two NIUs subsequent to, and four NIUs subsequent to, the NIU in question. For example, NIU 309 transmits to NIU 310, NIU 311, and NIU 313. To analogize to FIG. 2, the network of FIG. 3 has two separate chordal lengths, two and four.

The networks of FIGS. 2 and 3 are a compromise between a fully connected network, where each NIU is connected to every other NIU, and the ring network of FIG. 1. The networks of FIGS. 2 and 3 reduce delay at the cost of additional connections.

Both the networks of FIGS. 2 and 3, as well as other chordal ring networks, suffer from a very practical limitation with regard to their implementation. Specifically, the medium is typically implemented as a bundle of wires or optical waveguides. Considering cross section 317 of FIG. 3, it can be seen that at least seven communications channels are required to implement the chordal ring network. It can also be seen from the network of FIG. 3 that each NIU is inserted serially into a selected three of these seven channels, while the remainder simply propagate by the NIU untouched. Thus, in order to implement the network of FIG. 3, the installer must determine which wires to connect to each NIU from a bundle of wires. This problem becomes quite substantial when the network gets very large; i.e. hundreds or thousands of NIUs, and the number of chords is made greater.

SUMMARY OF THE INVENTION

The above problem is overcome in accordance with the present invention which is an improved chordal ring network. A plurality of NIUs are interconnected, where each NIU includes a plurality of inputs. At least two NIUs are identical, and preferably, all of the NIUs are identical. For purposes herein, "identical" means that the inputs are layed out physically in substantially the same pattern. The inputs of the NIUs are numbered according to a predetermined sequence, and corresponding inputs on identical NIUs are assigned the same numbers.

A multiple channel communications medium is divided into several non-overlapping portions, with each portion connecting two NIUs. Each channel in each portion connects a separate input of a first NIU to a separate output of the first NIU, and each output of the first NIU to a separate input of a second NIU. However, the input of the second NIU and the input of the first NIU which are connected to the same output of the first NIU are located in different positions of the input sequence, where the positions differ by a fixed number for each channel in each portion. Thus, as each channel traverses the NIUs, it is connected to the next position in the input sequence until it reaches a predetermined position, where it is cut and routed to the associated user equipment, thereby establishing the chords for the chordal network.

In other embodiments, several sets of channels may be "stacked", in order to establish more complicated networks, such as the chordal network of FIG. 3.

BRIEF DESCRIPTION OF THE DRAWINGS

FIG. 4 is a block diagram of a portion of a chordal ring network. The network comprises (1) user equipment 406-410, and (2) NIU 401-405, where each NIU comprises four outputs A-D, four inputs E-H, and four equipment ports I-L. The user equipment shown in FIG. 4 may be any typical user equipment such as a printer, a computer, network gateway, etc. For purposes of explanation and simplicity, it is assumed that all communications flows from left to right in FIG. 4, although in actuality, full duplex communications may be used.

Figure 1:
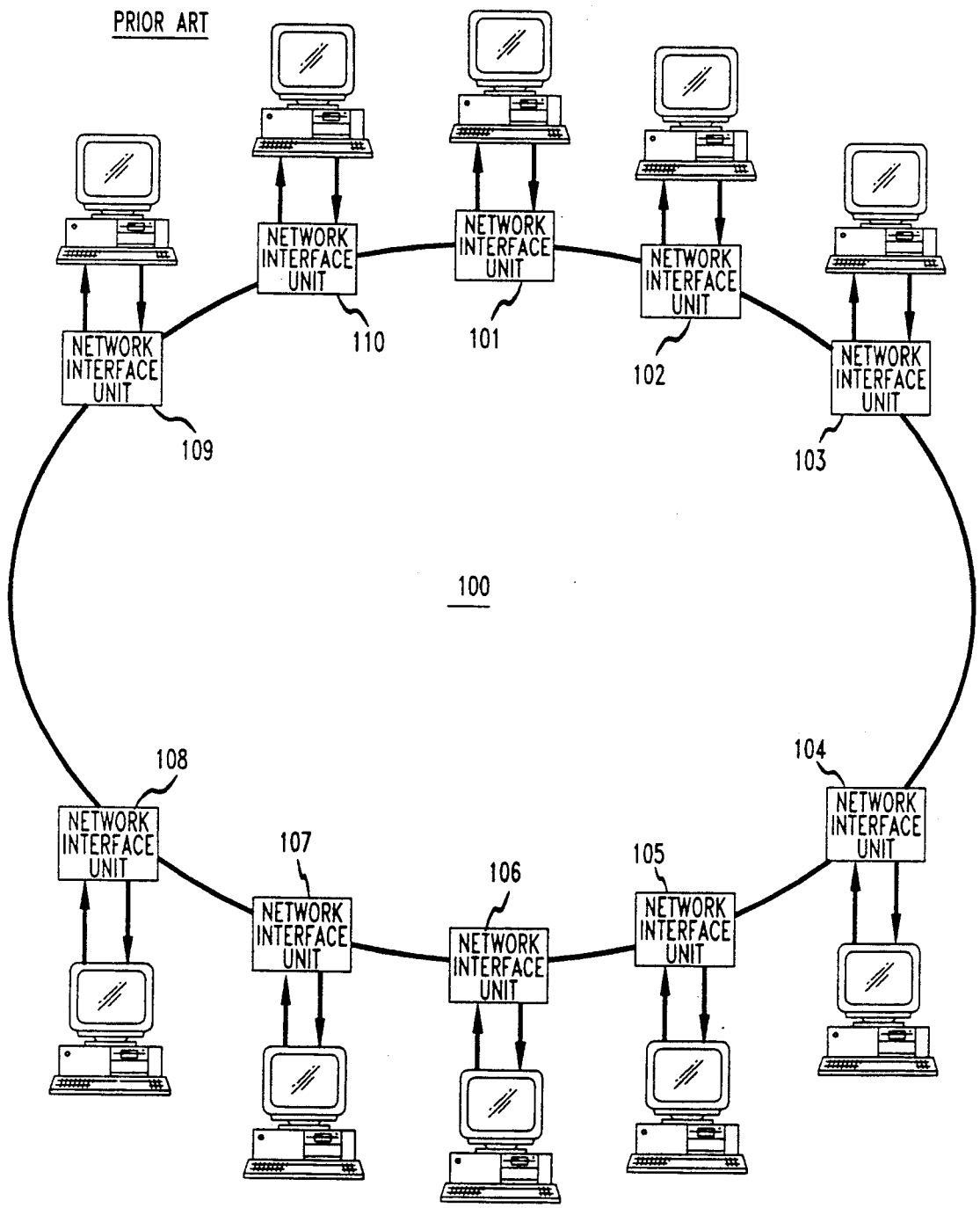
FIG. 1 shows a block diagram of a typical ring network.
Figure 2:
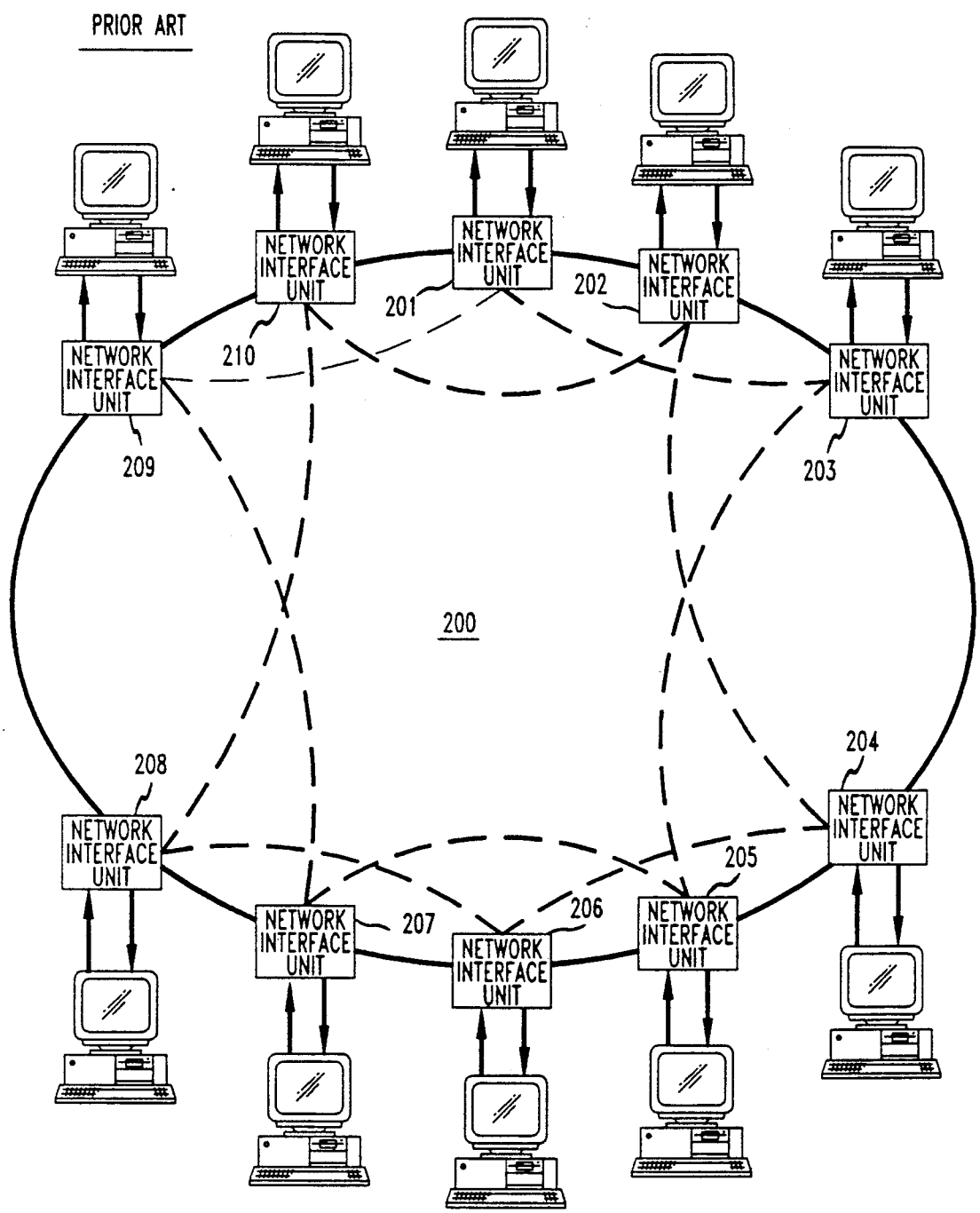
FIG. 2 shows a chordal ring network.

Note that the combination of input H, output D, and equipment ports I and L serve to link each NIU to its neighboring NIUs. For example, output D of NIU 401 is connected to input H of NIU 402, thereby allowing user equipment 406 to transmit data directly to user equipment 407. If the remaining inputs, outputs, and equipment ports were eliminated on each of the NIUs of FIG. 4, the resulting network would be identical to that of FIG. 1. However, the additional inputs E-G, outputs A-C, and equipment ports J-K, serve to establish the chords in the network, as described below.

Figure 4:
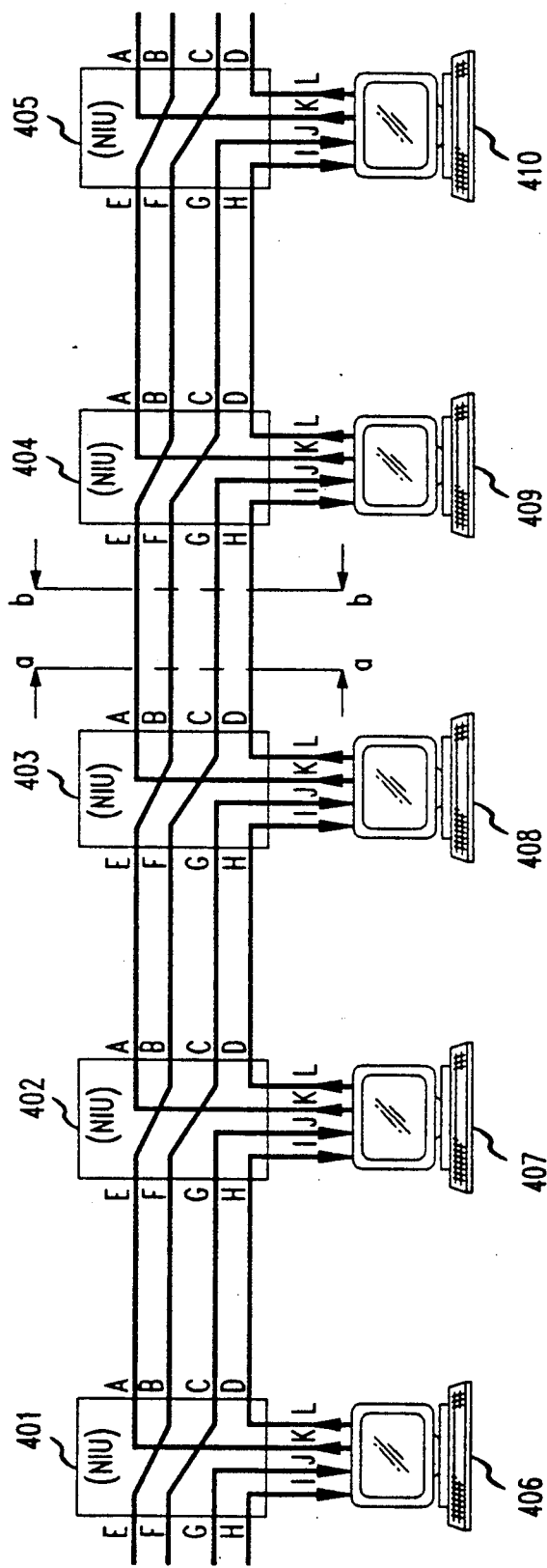
FIG. 4 is a portion of a chordal ring network constructed in accordance with the principles of the invention.

Close scrutiny of the network in FIG. 4 will reveal that the chordal length of the network of which FIG. 4 is a part is three. Specifically, note that equipment port K on NIU 401 serves to allow direct transmission of data from user equipment 406 to user equipment 409, while equipment port K on NIU 402 allows direct communications from user equipment 407 to user equipment 410.

The arrangement of FIG. 4 establishes the chords by utilizing three factors. First, note that each NIU includes a predetermined sequence of inputs. Each channel from the communications medium is cyclically rotated to the next input in the sequence as it traverses the NIUs. For example, note that the communications channel connected to input E of NIU 401 is the same communications channel connected to input F of NIU 402, which is the same communications channel connected to input G of NIU 403, and so forth. Second, within each NIU, predetermined ones of the communications channels are cut and routed to the NIU's associated user equipment. For example, the connection from input G to output A on each NIU is cut and routed to the associated user equipment. For purposes of explanation herein, input G and output A are "connected", even though this connection is cut and routed to the equipment port. Finally, the number of inputs at each NIU is selected in accordance with the chord length.

The arrangement of FIG. 4 has the distinct advantage that for each communications channel, there is an associated input at the NIU, and that this association is the same for each NIU. Consider, for example, the case where the communications medium is a ribbon cable. Note that the uppermost channel in FIG. 4 would be connected to input E of every NIU, regardless of where that NIU is disposed in the sequence of NIUs. Thus, when the NIU's are installed, the installer need not worry about which channels are being used to establish which chords. Rather, he simply connects each of the four inputs E-G to its associated communications channel, and the chordal ring is established.

Figure 5:
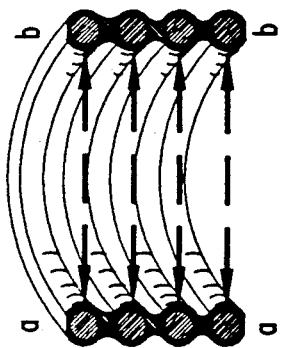
FIG. 5 shows two cross sections of an exemplary communications medium for use with the network of FIG. 4.

FIG. 5 depicts two cross sections of an exemplary ribbon cable which may be used in the chordal ring network of FIG. 4. The small circles in FIG. 5 represent the individual communications channels on the ribbon cable. Note that cross sections a and b are mirror images of each other, and that corresponding channels appear in corresponding positions of their respective cross section. For example, the uppermost circle in FIG. 5a and the uppermost circle in FIG. 5b correspond to the same channel.

FIG. 4 shows that each NIU is arranged so that each input to that connector will be input to the next input in the sequence of inputs on the next NIU. For example, input E on NIU 402 is connected to output B. Thus, the channel connected to input E on NIU 402 will be connected to input F on NIU 403. This shifting of each communications channel in order to establish the chords, may also be done outside the NIU.

Figure 6:
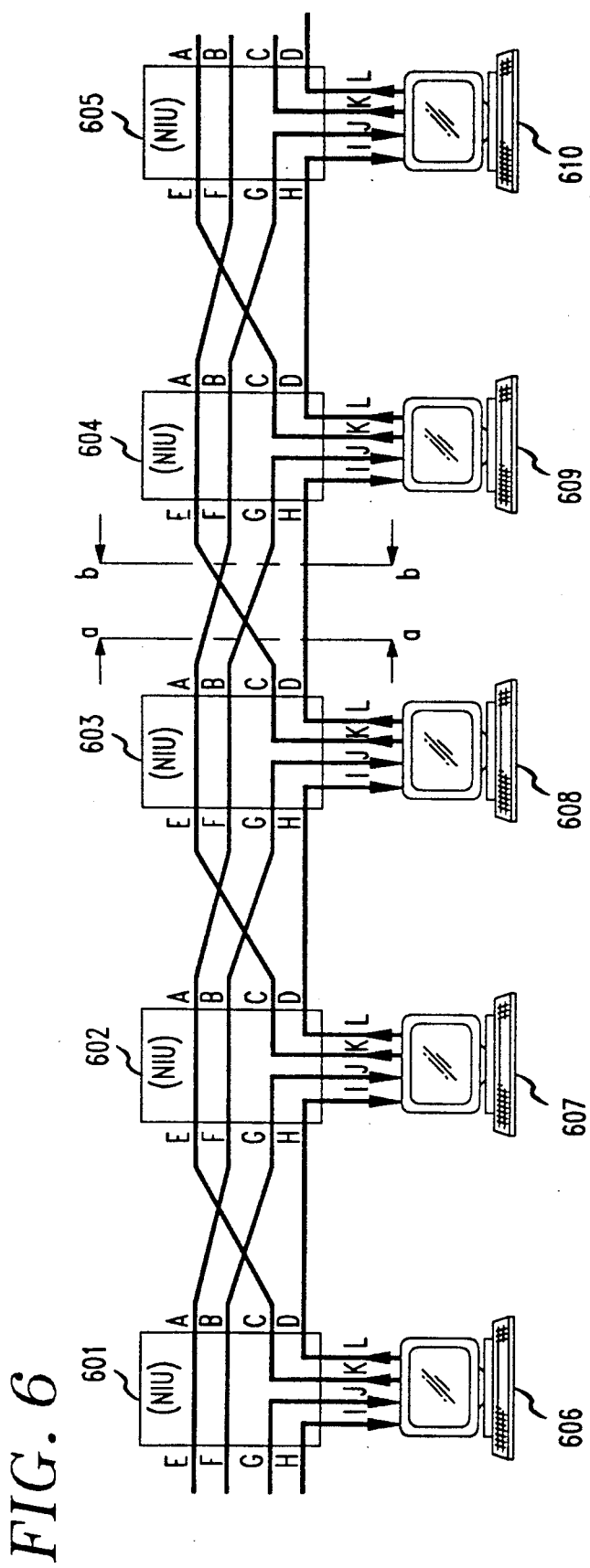
FIG. 6 depicts another exemplary embodiment of a portion of a network in accordance with the invention.

FIG. 6 shows a portion of a chordal ring network, the shown portion comprising 5 NIUs 601-605. The arrangement of FIG. 6 is similar to that of FIG. 4, except that the shifting of each communications channel to the next input in the sequence of inputs is done outside the NIU.

Figure 7:
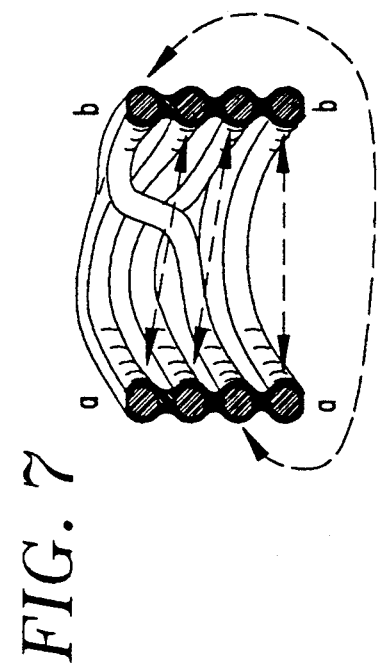
FIG. 7 shows two cross sections of an exemplary communications medium for use with the network of FIG. 6.

Shown in FIG. 7 are two cross sections of the communications medium of FIG. 6, where the cross sections are taken at the points denoted in FIG. 6. The smaller circles in FIGS. 7a and 7b represent the actual communications channels within the communications medium. FIG. 7 also shows which circles correspond to the same channel. As can be seen from FIG. 7, circles in corresponding locations of the communications medium do not correspond to the same channel. For example, the uppermost circle in FIG. 7a (left) is not the same channel represented by the uppermost circle in FIG. 7b (right). For this reason, the arrangement of FIG. 4 may be simpler to implement than that of FIG. 6. With the arrangement of FIG. 4, the shifting is done within the NIU, and the cross sections of the cable would be mirror images of each other, with corresponding channels in corresponding positions of the mirror image. This feature is particularly convenient when the communications medium is a large two dimensional bundle. For example, if the cross section of the communications medium were a 10×10 matrix of wires, it would be significantly easier for the installer if the arrangement of FIG. 4 were used.

Figure 3:
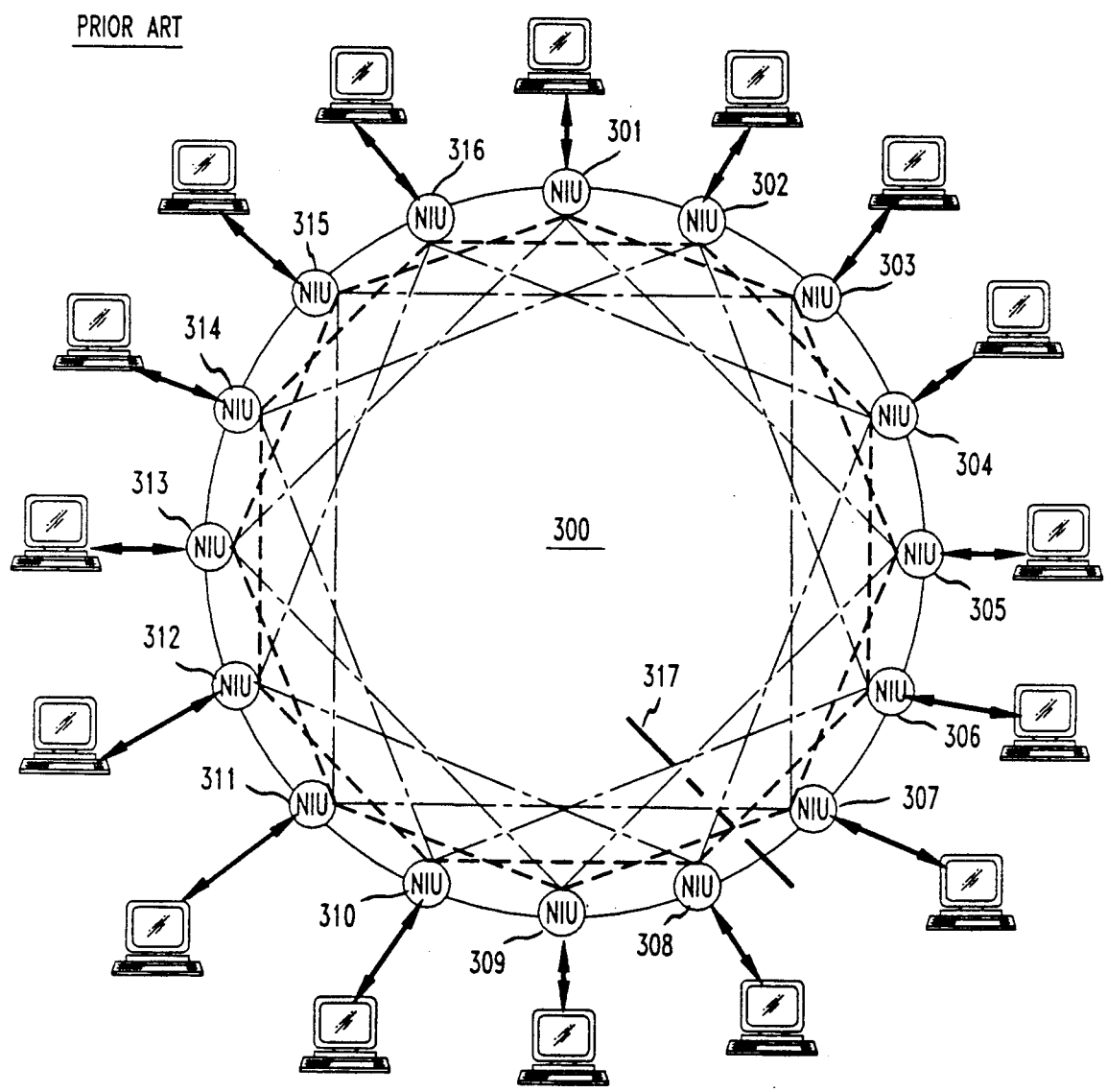
FIG. 3 is a block diagram of a more complex chordal ring network, including multiple chords.
Figure 8:
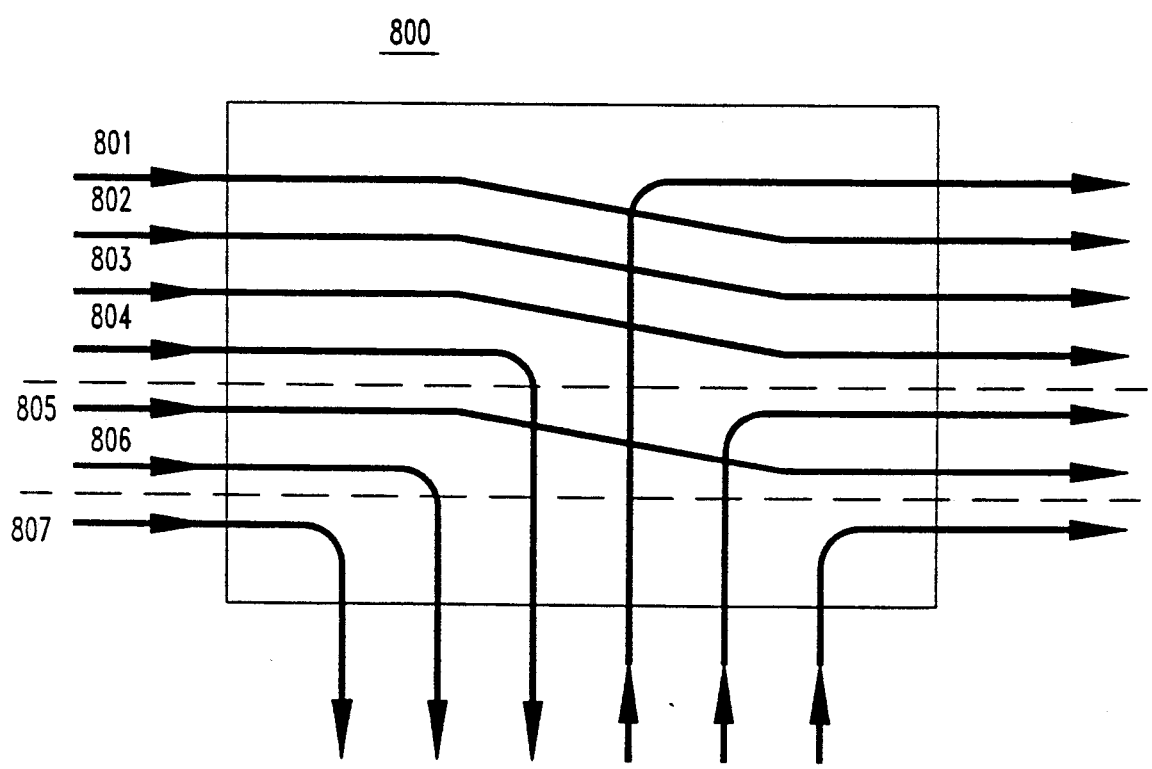
FIG. 8 is an example of a connector which may be used in a more complex chordal ring network.

FIG. 8 shows a exemplary embodiment of an NIU which may be used to configure the chordal ring network of FIG. 3. FIG. 8 depicts how several sets of communications channels may be "stacked" in order to implement multiple chords in the network. In FIG. 8, inputs 801-804 are used to establish the chords of length 4, while inputs 805-806 are used to establish the chords of chordal length 2. Finally, inputs 807 is used to link each NIU to its nearest neighbor. While FIG. 8 also shows a relatively small number of communications channels, it can be appreciated that the shifting of channels is more complex than in the previous FIGS. When the number of channels gets into hundreds, the shifting patterns may become quite complex.

It is to be understood that the above examples are given for illustrative purposes only, and that other embodiments that fall within the scope and spirit of the invention will be apparent to those of ordinary skill in the art. For example, the communications medium may be optical, electrical, etc. The shifting may be done in two dimensions, rather than in one as shown herein.

The shifting may even be done by more than one position in the input sequence. Each input may be labeled with an associated number, in order to make installation easier.

I claim:

1. A chordal network comprising:

a plurality of Network Interface Units (NIUs), each NIU including a plurality of inputs in a predetermined sequence, a plurality of outputs in a predetermined sequence, at least two user equipment ports, and a plurality of connections from predetermined inputs to predetermined outputs, at least one connection being cut within the NIU to form two ends, the ends each being routed to a separate user equipment port, at least two NIUs being substantially identical, and including a substantially identical sequence of inputs;

a multiple portion communications medium, each portion connecting two NIUs and comprising a plurality of channels, at least one portion connecting two identical NIUs, each channel in the portion connecting two identical NIUs connecting a separate output of a first NIU to a separate input of a second NIU, each output of the first NIU also being connected to a separate input of the first NIU, the input to the first NIU and to the second NIU differing in their respective positions in the sequence of inputs by a fixed number of positions for each channel in the portion.

2. The chordal network of claim 1 wherein the fixed number of positions is one.

3. The chordal network of claims 1 or 2 wherein the channels are fiber optic waveguides.

4. The chordal network of claims 1 or 2 wherein the communications medium is a ribbon cable.

5. The chordal network of claims 1 or 2 wherein, for any two cross sections in a portion of the communications medium, each channel is located in a corresponding position of both cross sections.

6. The chordal ring network of claims 1 or 2 wherein all of said NIUs are substantially identical.

7. The chordal ring network of claim 3 wherein all of said NIUs are substantially identical.

8. The chordal ring network of claim 4 wherein all of said NIUs are substantially identical.

9. The chordal ring network of claim 5 wherein all of said NIUs are substantially identical.

* * * * *